United States Patent [19]

Scherubel et al.

[11] 4,301,868
[45] Nov. 24, 1981

[54] METHOD USING HYDROCARBON FOAMS AS WELL STIMULANTS

[75] Inventors: Gary A. Scherubel, University City; Michael A. Thorne, Kirkwood, both of Mo.

[73] Assignee: Petrolite Corporation, St. Louis, Mo.

[21] Appl. No.: 85,182

[22] Filed: Oct. 15, 1979

[51] Int. Cl.$^3$ ............ E21B 21/14; E21B 43/25; E21B 43/267

[52] U.S. Cl. ............ 166/308; 166/280; 166/309; 166/312; 252/8.55 R; 252/8.55 B

[58] Field of Search ......... 166/281, 308, 309, 311, 166/312; 175/69; 252/8.55 B, 8.55 C, 8.55 R

[56] References Cited

U.S. PATENT DOCUMENTS

| | | | |
|---|---|---|---|
| 3,136,361 | 6/1964 | Marx | 166/308 |
| 3,196,944 | 7/1965 | Bernard et al. | 166/274 X |
| 3,463,231 | 8/1969 | Hutchison et al. | 166/312 X |
| 3,486,560 | 12/1969 | Hutchison et al. | 166/312 X |
| 3,495,664 | 2/1970 | Kelly, Jr. | 175/69 |
| 3,662,828 | 5/1972 | Hutchison | 166/312 |
| 3,685,807 | 8/1972 | Campbell | 166/312 X |
| 3,937,283 | 2/1976 | Blauer et al. | 166/308 X |

FOREIGN PATENT DOCUMENTS 659810  3/1963  Canada ............ 252/8.55 B

*Primary Examiner*—Stephen J. Novosad
*Assistant Examiner*—George A. Suchfield
*Attorney, Agent, or Firm*—Sidney B. Ring; Hyman F. Glass

[57] ABSTRACT

This invention relates to the use of silicone-induced hydrocarbon foams as well stimulants, for example as illustrated by their use in fracturing well formations, removal of paraffin in wells, removal of condensate hydrocarbons from blocked gas wells, etc.

5 Claims, No Drawings

METHOD USING HYDROCARBON FOAMS AS WELL STIMULANTS

This invention relates to the use of silicone-induced hydrocarbon foams as well stimulants, for example as illustrated by their use in fracturing well formations, removal of paraffin in wells, removal of condensate hydrocarbons from blocked gas wells, etc.

Foams in the oil well service industry are widely used as fracturing fluids, for creating cracks in the rock formation, thus making more rock surface area available for flow of oil or gas. Foamed fluids possess a number of advantages over the more conventional unfoamed systems. Generally, conventional systems use a thickening agent to create enough viscosity so that the rock cannot accept fluid as rapidly as it is being pumped. When the pressure of the fluid against the rock exceeds the overburden pressure, a crack or fracture is formed which radiates from the well bore. These thickened fluids are rarely clean, often leaving residues which can plug pore spaces in the created fracture and reduce flow capacity. Foamed fluids can be made to produce viscous systems without the use of thickening agents, therefore, affording a clean, residue free fracturing fluid. Also, the return of stimulation fluids from the well can be a time consuming process depending on bottom hole conditions. Foams possess the advantage of reducing the amount of fluid to be removed from the well, before the well is put on production. The gas phase provides energy to push the liquid phase out of the rock matrix and also lightens the hydrostatic head of the fluid being removed from the well bore.

There are a large number of formations which are sensitive to water. These are generally formations containing clays which swell on contact with water. In these wells it is necessary to fracture with a non-aqueous fluid such as kerosene, diesel oil, or the naturally produced fluids. These oil based fluids are considerably more expensive than aqueous fluids and it would be highly desirable to reduce the volume of the liquid phase.

Until recently the formation of substantially stable hydrocarbon foams for fracturing has not been possible. Chemicals used to achieve this foam stability make use of a fluorocarbon surfactant. These fluorocarbon surfactants have the disadvantage of high cost and they may poison catalysts used in the cracking and refining of crude oil.

It would, therefore, be a beneficial advance in the hydrocarbon foaming art if a material could be found which contains no organically bound halogen, provides substantial hydrocarbon foam stability for fracturing purposes and which performs effectively on a cost performance basis.

We have now discovered that silicone-induced hydrocarbon foams can be used as well stimulants, for example as illustrated in fracturing well formations, removal of paraffin in wells, removal of condensate hydrocarbons from blocked gas wells, etc.

A wide variety of silicones (also known as "organopolysiloxanes") can be employed in this invention provided they are capable of producing hydrocarbon foams capable of functioning in this invention.

In general the silicones are polymers containing the following units

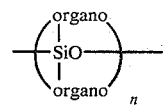

The preferred organo group is hydrocarbon such as alkyl and most preferably methyl. Thus, the preferred organopolysiloxane contains the following units

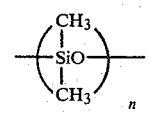

These polymers may be expressed as follows:

and in the case of the preferred embodiment

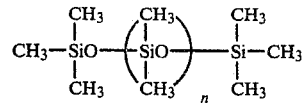

Any molecular weight can be employed provided it is capable of producing the hydrocarbon foam capable of performing in this invention. In practice, molecular weight of about 1,000 to 100,000, such as from about 2,000 to 75,000, for example from about 3,000 to 50,000, and preferably from about 5,000 to 20,000 can be employed.

The amount of silicone employed in foaming the hydrocarbon can vary widely depending on the hydrocarbon, the particular silicone, the particular system and use in which it is employed, etc. In general, the concentration of the silicone in the hydrocarbon as volume percent of the hydrocarbon employed can vary from about 0.9% to 10% such as from about 0.2 to 5%, for example from about 0.3 to 3%, but preferably from about 0.5 to 2%, with a working optimum of about 1%.

In general, the foam is prepared by any suitable means. In general, the hydrocarbon is mixed with silicone and as the mixture is being pumped, nitrogen is injected between the blender and the well head. If desired, thickening agents may be added to increase the viscosity stability and sand-carrying capacity of the foam.

Sand or other suitable props are employed to be carried by the foam into the formation so as to prop the fracture after the force on the foam is removed.

The following examples are presented for purposes of illustration and not of limitation. The foaming properties of the hydrocarbon systems were tested by the following procedure.

TEST PROCEDURE

1. Pressure Vessel—A 150 cm³ stainless steel gas sampling cylinder is fitted with valves on both ends. The valve at the top connects to a regulated nitrogen supply and that at the bottom feeds the liquid to the foam generator. To facilitate filling, the valve threads (¼" pipe threads) are sealed with Teflon pipe seal tape so that the valves are easily removed and reassembled. The cylinder (Part No. 304-HDF4-150) and valves (Part No. 55-14DKM4) are supplied by the Whitey Company (Cleveland, Ohio).

2. Foam Generator—The generator is connected, by compression fittings, to the pressure vessel on the inlet end and to a 150 mm×64 OD delivery tube made of copper tubing on the outlet end. The copper delivery tube is terminated with a 50 mm×5.0 mm ID glass tube (connected with rubber tubing). To improve foam properties, the glass tube contains a rolled 30 mm×30 mm section of 60 mesh stainless steel wire gauze. Liquid enters the foam generator through the inlet orifice and air is drawn in through the air ports, causing foam to be produced. The foam exits through the outlet orifice.

The test procedure is as follows:

1. Add 100 mls of test fluid containing 1% of surfactant, to the pressure vessel.
2. Apply 100 psi $N_2$ pressure to the pressure vessel.
3. Open outlet valve and collect foam in a graduated 500 ml cylinder.
4. Measure initial foam height, and the time required to drain 50 mls of fluid from the foam.
5. Foam quality is simply determined by the following equation:

$$\text{Foam Quality} = \frac{V\text{ Foam} - V\text{ Liquid}}{V\text{ Foam}}$$

where: V Foam=Volume occupied by foam
and: V Liquid=Volume of liquid used.

6. Foam half life is defined as the time required to drain half the fluid volume from the foam.

In general, the foam quality should be at least about 52 or greater, such as from about 52 to 99, for example from about 55 to 90, but preferably from about 60 to 85.

A foam with a foam quality below 52 is theoretically not a true foam but a mixture of gas bubbles suspended in a liquid and subsequently may not function as well as a true foam. However, under proper conditions these foams having foam quality below 52 can also be used in this invention, provided they can perform the intended function.

The results are presented in the following table.

TABLE I

| Oil | Silicone Polymer-1% by Vol. | Foam Height in ml | Foam Quality | Foam Half Life |
|---|---|---|---|---|
| Kerosene | None | No Foam | — | — |
| Kerosene | Dow Corning 200 Fluid 350 cs | 325 | 69 | 1 min., 32 sec. |
| Kerosene | Dow Corning 3011 antifoam | 240 | 58 | 1 min., 32 sec. |
| Kerosene | Dow Corning 1250 surfactant | 225 | 55 | 2 min., 12 sec. |
| #2 Diesel | None | No Foam | — | — |
| #2 Diesel | 200 Fluid 350 cs | 220 | 54 | 30 sec. |
| #2 Diesel | 3011 Antifoam | 215 | 53 | 2 min., 12 sec. |
| #2 Diesel | 1250 Surfactant | 220 | 54 | 2 min., 32 sec. |
| Condensate | None | No Foam | — | — |
| Condensate | 200 Fluid 350 cs | 260 | 62 | 12 sec. |
| Condensate | 3011 Antifoam | 270 | 63 | 15 sec. |
| Condensate | 1250 Surfactant | 240 | 58 | 10 sec. |
| Xylene | None | No Foam | — | — |
| Xylene | 200 Fluid 350 cs | 425 | 76 | 58 sec. |
| Xylene | 3011 Antifoam | 275 | 64 | 1 min., 31 sec. |
| Xylene | 1250 Surfactant | 310 | 68 | 1 min., 20 sec. |

TABLE II

The Molecular Weight Range of the Various Surfactants of Table I.

| Silicone Polymer | Mw | Mn |
|---|---|---|
| Dow Corning 200 Fluid 350 cs | 20,000 | 8,800 |
| Dow Corning 3011 Antifoam | 9,760 | 3,290 |
| Dow Corning 1250 Surfactant | 5,770 | 3,160 |

The following examples are presented to illustrate typical field examples using the foam of this invention.

FIELD EXAMPLE 1

It is desired to stimulate production from a water sensitive gas well in South Texas. A hydrocarbon frac fluid is necessary since water could damage the formation. The well is fractured with 20,000 gallons of #2 diesel, foamed with nitrogen to produce an 80 quality foam. The foaming agent based on Dow Corning 1250 surfactant, is used at a volume of 10 gallons surfactant per 1000 gallons of #2 diesel. The frac fluid carries with it 1–2 pounds of 20–40 mesh sand per gallon to serve as props for the fracture.

On completion of the frac job by releasing pressure the load is allowed to flow back, leaving the sand in place to prop the fracture. The added energy afforded by the nitrogen helps to unload the diesel fluid more quickly than is the case with conventional gelled oil systems.

FIELD EXAMPLE 2

This example illustrates foaming xylene to remove paraffin deposits. Since foam has low leak-off properties, and greatly expands the volume of a given liquid, this greatly increases the "reach" of a quantity of solvent.

In this example 2500 gallons of xylene containing 20 gallons of foaming agent, based on Dow Corning 1250 surfactant, is foamed with nitrogen to produce an 80 quality foam, and pumped into the well. This is followed by 5000 gallons of water, foamed with nitrogen to produce an 80 quality foam, to force the xylene foam further into the formation. The pressure is then released and the fluids allowed to flow back to the surface.

FIELD EXAMPLE 3

In this example it is desired to clean out crushed 20–40 mesh frac sand from the well bore of a gas well. Since this is a water sensitive formation it was desired to foam condensate which is produced from the formation.

The foaming agent is used at a concentration of 10 gallons per thousand gallons of condensate. The condensate is foamed with nitrogen to produce a 60 quality foam. The foam is pumped through coil tubing down to the crushed frac sand, carrying the sand up the annulus to the surface.

We claim:

1. A process of well stimulation, comprising forcing an organo-polysiloxane-induced hydrocarbon foam mixture suitable for use in well stimulation into said well, said hydrocarbon being selected from the group consisting of kerosene, #2 diesel oil, well formation condensate and xylene, said siloxane having a molecular weight of from about 5,770 to about 20,000 and being of a concentration of from about 0.5 to about 2% by volume in said hydrocarbon and injecting nitrogen into said mixture.

2. The process of claim 1 where the well stimulation process is characterized by forcing the silicone-induced foam into the formation so as to fracture the formation and then releasing the force.

3. The process of claim 2 where 20-40 mesh sand props for the fracture are employed.

4. The process of claim 1 where the well stimulation process is characterized by forcing the silicone-induced foam into a well containing paraffin and then releasing the force.

5. The process of claim 1 where the process is characterized by pressure forcing the foam to the bottom of the well bore so as to foam out the 20-40 mesh frac sand blocking or inhibiting well production.

* * * * *